US012311567B2

(12) United States Patent
Torrenga et al.

(10) Patent No.: US 12,311,567 B2
(45) Date of Patent: May 27, 2025

(54) RELEASABLE SIDE STRAPPING ASSEMBLY FOR A FOOD PRODUCT SLICING APPARATUS

(71) Applicant: Provisur Technologies, Inc., Chicago, IL (US)

(72) Inventors: Ryan Michael Torrenga, Bourbonnais, IL (US); Michael Scott Severns, Naperville, IL (US)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 434 days.

(21) Appl. No.: 18/045,894

(22) Filed: Oct. 12, 2022

(65) Prior Publication Data

US 2023/0126324 A1 Apr. 27, 2023

Related U.S. Application Data

(60) Provisional application No. 63/271,459, filed on Oct. 25, 2021.

(51) Int. Cl.
*B26D 7/26* (2006.01)
*B26D 1/00* (2006.01)
(Continued)

(52) U.S. Cl.
CPC ......... *B26D 7/2614* (2013.01); *B26D 1/0006* (2013.01); *B26D 1/06* (2013.01);
(Continued)

(58) Field of Classification Search
CPC ...... B26D 7/2614; B26D 1/0006; B26D 1/06; B26D 5/007; B26D 5/22; B26D 5/42;
(Continued)

(56) References Cited

U.S. PATENT DOCUMENTS

| | | | |
|---|---|---|---|
| 2,036,012 | A | 3/1936 | Bellinghausen |
| 2,347,818 | A | 5/1944 | Folk |

(Continued)

FOREIGN PATENT DOCUMENTS

| | | | |
|---|---|---|---|
| AU | 200111314 | A1 | 5/2001 |
| AU | 2013202066 | A1 | 10/2013 |

(Continued)

OTHER PUBLICATIONS

International Search Report and Written Opinion for PCT/US2022/047623 mailed dated Apr. 17, 2023, 58 pages.

*Primary Examiner* — Omar Flores Sanchez
(74) *Attorney, Agent, or Firm* — Klintworth & Rozenblat IP LLP

(57) ABSTRACT

A food product slicing apparatus for slicing food products into slices is provided. A frame mounts a drive assembly which is configured to move the food products relative to the frame, a side strapping assembly which side straps a side of the food product, and a slicing blade configured to slice the food products into slices. The side strapping assembly is mounted to the frame proximate to the drive assembly. The
(Continued)

side strapping assembly includes a releasable clamp which couples a blade of the side strapping assembly to the frame. The clamp can be released without the use of tools.

20 Claims, 10 Drawing Sheets

(51) Int. Cl.

| | |
|---|---|
| ***B26D 1/06*** | (2006.01) |
| ***B26D 5/00*** | (2006.01) |
| ***B26D 5/22*** | (2006.01) |
| ***B26D 5/42*** | (2006.01) |
| ***B26D 7/01*** | (2006.01) |
| ***B26D 7/06*** | (2006.01) |
| ***B26D 7/32*** | (2006.01) |
| *B26D 1/28* | (2006.01) |
| *B26D 7/00* | (2006.01) |

(52) U.S. Cl.
CPC ............... *B26D 5/007* (2013.01); *B26D 5/22* (2013.01); *B26D 5/42* (2013.01); *B26D 7/01* (2013.01); *B26D 7/0608* (2013.01); *B26D 7/0625* (2013.01); *B26D 7/0633* (2013.01); *B26D 7/0641* (2013.01); *B26D 7/32* (2013.01); *B26D 2001/0013* (2013.01); *B26D 2001/0046* (2013.01); *B26D 1/28* (2013.01); *B26D 2007/0018* (2013.01); *B26D 2210/02* (2013.01)

(58) Field of Classification Search
CPC ...... B26D 7/01; B26D 7/0608; B26D 7/0625; B26D 7/0633; B26D 7/0641; B26D 7/32; B26D 1/28; B26D 2001/0013; B26D 2001/0046; B26D 2007/0018; B26D 2210/02
See application file for complete search history.

(56) References Cited

U.S. PATENT DOCUMENTS

| | | | | | |
|---|---|---|---|---|---|
| 2,714,574 | A | | 8/1955 | Kearney | |
| 3,105,433 | A | | 10/1963 | Yerex et al. | |
| 3,179,039 | A | | 4/1965 | Christensen | |
| 3,667,521 | A | | 6/1972 | Beasley | |
| 3,842,260 | A | | 10/1974 | Christensen et al. | |
| 3,846,958 | A | | 11/1974 | Divan | |
| 3,894,457 | A | * | 7/1975 | Miller | B26D 7/32 83/77 |
| 3,901,140 | A | | 8/1975 | Dohm, Jr. | |
| 3,982,299 | A | | 9/1976 | Kompan | |
| 3,990,336 | A | | 11/1976 | Soodalter | |
| 4,119,004 | A | * | 10/1978 | Ludwig | B26D 1/0006 83/661 |
| 4,179,985 | A | | 12/1979 | Baker et al. | |
| 4,196,561 | A | * | 4/1980 | Kruse | B65B 43/42 198/803.2 |
| 4,557,019 | A | | 12/1985 | Van Devanter et al. | |
| 4,651,384 | A | | 3/1987 | Korhonen | |
| 4,815,919 | A | | 3/1989 | Juravic | |
| 4,962,568 | A | | 10/1990 | Rudy et al. | |
| 4,967,652 | A | | 11/1990 | Mally | |
| 5,048,719 | A | | 9/1991 | Empl et al. | |
| 5,054,345 | A | | 10/1991 | Weber | |
| 5,056,648 | A | | 10/1991 | Huber et al. | |
| 5,064,667 | A | | 11/1991 | Mally | |
| 5,117,717 | A | | 6/1992 | Mally | |
| 5,152,208 | A | * | 10/1992 | Ruetschle | B26D 7/0675 220/817 |
| 5,186,090 | A | | 2/1993 | Bunch, Jr. | |
| 5,201,259 | A | | 4/1993 | Covert et al. | |
| 5,241,887 | A | | 9/1993 | Wolff et al. | |
| 5,249,491 | A | | 10/1993 | Carter | |
| 5,267,168 | A | | 11/1993 | Antonissen et al. | |
| 5,271,304 | A | | 12/1993 | Wygal et al. | |
| 5,314,375 | A | | 5/1994 | O'Brien et al. | |
| 5,324,228 | A | | 6/1994 | Vogeley, Jr. | |
| 5,334,084 | A | | 8/1994 | O'Brien et al. | |
| 5,343,791 | A | | 9/1994 | Julian et al. | |
| 5,410,954 | A | | 5/1995 | Wygal et al. | |
| 5,423,250 | A | | 6/1995 | Anderson et al. | |
| 5,423,657 | A | | 6/1995 | Frost et al. | |
| 5,429,548 | A | | 7/1995 | Long et al. | |
| 5,431,935 | A | | 7/1995 | Carey | |
| 5,470,274 | A | | 11/1995 | Kadi et al. | |
| 5,481,466 | A | | 1/1996 | Carey | |
| 5,482,166 | A | | 1/1996 | Brown | |
| 5,580,599 | A | | 12/1996 | Fehr | |
| 5,668,634 | A | | 9/1997 | Newman | |
| 5,720,593 | A | | 2/1998 | Pleake | |
| 5,727,997 | A | | 3/1998 | Dufour et al. | |
| 5,784,937 | A | | 7/1998 | Wygal et al. | |
| 5,902,177 | A | | 5/1999 | Tessier et al. | |
| 5,944,598 | A | | 8/1999 | Tong et al. | |
| 5,974,925 | A | | 11/1999 | Lindee et al. | |
| 6,123,004 | A | * | 9/2000 | Matz | B26D 7/2614 83/751 |
| 6,129,625 | A | | 10/2000 | Cate et al. | |
| 6,186,059 | B1 | | 2/2001 | Mello et al. | |
| 6,189,059 | B1 | | 2/2001 | Sotek et al. | |
| 6,198,834 | B1 | | 3/2001 | Belk et al. | |
| 6,407,818 | B1 | | 6/2002 | Whitehouse | |
| 6,511,370 | B1 | | 1/2003 | Mello et al. | |
| 6,601,499 | B1 | | 8/2003 | Bifulco | |
| 6,604,991 | B1 | | 8/2003 | Jurs et al. | |
| 6,692,345 | B1 | | 2/2004 | Kruger | |
| 6,837,030 | B2 | | 1/2005 | Drebing et al. | |
| 6,859,282 | B1 | | 2/2005 | Weber et al. | |
| 6,860,804 | B2 | | 3/2005 | Kruger | |
| 6,882,434 | B1 | | 4/2005 | Sandberg et al. | |
| 6,931,973 | B2 | | 8/2005 | Kuchler | |
| 6,997,089 | B2 | | 2/2006 | Lindee et al. | |
| 7,052,388 | B2 | | 5/2006 | Houtz | |
| 7,055,419 | B2 | | 6/2006 | Sandberg | |
| 7,156,730 | B1 | | 1/2007 | Blaine | |
| 7,251,537 | B1 | | 7/2007 | Blaine et al. | |
| 7,364,504 | B2 | | 4/2008 | Gasbarro | |
| 7,373,217 | B2 | | 5/2008 | Young | |
| 7,399,220 | B2 | | 7/2008 | Kriesel et al. | |
| 7,404,759 | B2 | | 7/2008 | Sato | |
| 7,450,247 | B2 | | 11/2008 | Sandberg et al. | |
| 7,452,266 | B2 | | 11/2008 | Bottemiller | |
| 7,500,550 | B2 | | 3/2009 | Strong et al. | |
| 7,621,806 | B2 | | 11/2009 | Bottemiller et al. | |
| 7,623,249 | B2 | | 11/2009 | Sandberg et al. | |
| 7,651,388 | B2 | | 1/2010 | Faires et al. | |
| 7,698,977 | B2 | | 4/2010 | Culling | |
| 7,715,935 | B2 | | 5/2010 | Vogeley et al. | |
| 7,747,042 | B2 | | 6/2010 | Blaine | |
| 7,841,264 | B2 | | 11/2010 | Kim et al. | |
| 7,918,718 | B2 | | 4/2011 | Christensen et al. | |
| 7,949,414 | B2 | | 5/2011 | Blaine et al. | |
| 8,016,649 | B2 | | 9/2011 | Schimitzek | |
| 8,025,000 | B2 | | 9/2011 | Kim et al. | |
| 8,096,860 | B2 | | 1/2012 | Bolte et al. | |
| 8,109,065 | B2 | | 2/2012 | Drebing et al. | |
| 8,116,554 | B2 | | 2/2012 | Burton | |
| 8,166,856 | B2 | | 5/2012 | Kim et al. | |
| 8,373,749 | B2 | | 2/2013 | Burton | |
| 8,404,069 | B2 | | 3/2013 | Douglas | |
| 8,495,938 | B2 | | 7/2013 | Weber | |
| 8,517,806 | B2 | | 8/2013 | Fillenworth et al. | |
| 8,529,321 | B2 | | 9/2013 | Weber | |
| 8,643,851 | B2 | | 2/2014 | Weber | |
| 8,651,000 | B2 | | 2/2014 | Weber | |
| 8,679,565 | B2 | | 3/2014 | Finkowski | |
| 8,683,903 | B2 | | 4/2014 | Strong et al. | |
| 8,688,267 | B2 | | 4/2014 | Blaine et al. | |
| 8,721,405 | B2 | | 5/2014 | McKenna et al. | |
| 8,740,541 | B2 | | 6/2014 | Pryor et al. | |
| 8,755,051 | B2 | | 6/2014 | Thiedig | |

(56) References Cited

U.S. PATENT DOCUMENTS 8,758,099 B2 6/2014 Reifenhaeuser
8,862,262 B2 10/2014 Thorsson et al.
8,869,664 B2 10/2014 Eyles et al.
8,892,239 B2 11/2014 Weber
8,893,599 B2 11/2014 Reifenhaeuser
8,968,808 B1 3/2015 Kunert et al.
8,986,080 B2 3/2015 Black et al.
8,997,969 B2 4/2015 Plakolm
9,061,432 B2 6/2015 Reifenhaeuser
9,091,673 B2 7/2015 Fern et al.
9,095,147 B2 8/2015 Hjalmarsson et al.
9,198,442 B2 12/2015 Peters et al.
9,247,755 B1 2/2016 Andre et al.
9,272,428 B2 3/2016 Mueller et al.
9,285,213 B2 3/2016 Lindee et al.
9,351,498 B2 5/2016 Grimm et al.
9,386,780 B2 7/2016 Soncini
9,424,061 B2 8/2016 Freimuth et al.
9,427,014 B2 8/2016 Graham et al.
9,526,257 B1 12/2016 Farrant et al.
9,538,768 B2 1/2017 Dunivan
9,561,913 B2 2/2017 Briel et al.
9,597,812 B2 3/2017 Schmeiser
9,700,060 B2 * 7/2017 Inoue ........................ B26D 3/24
9,737,942 B2 8/2017 Nispel
9,770,838 B2 9/2017 Kim et al.
9,778,651 B2 * 10/2017 Strong ............... G05B 19/4185
9,828,185 B1 11/2017 Talken et al.
9,888,696 B2 2/2018 Lindee et al.
9,913,483 B2 * 3/2018 Vuholm .................... G06T 7/13
9,962,782 B2 5/2018 Nispel
9,999,985 B2 6/2018 Middleton et al.
10,040,213 B2 8/2018 Nielsen
10,065,335 B2 9/2018 Mayer et al.
10,245,742 B2 4/2019 Foreman et al.
10,245,745 B2 4/2019 Volkl et al.
10,315,326 B2 6/2019 Achenbach et al.
10,492,504 B2 12/2019 Volkl et al.
10,510,204 B2 12/2019 Castellano
10,538,009 B2 1/2020 Schmeiser et al.
10,654,185 B2 5/2020 Blaine et al.
10,661,466 B2 5/2020 Mayer et al.
10,682,781 B2 6/2020 Perini
10,695,931 B2 6/2020 Perini
10,695,932 B2 6/2020 Burk et al.
10,710,259 B2 7/2020 Völkl et al.
10,759,071 B2 9/2020 Chan
10,836,063 B2 11/2020 Mayer et al.
10,843,362 B2 11/2020 Grasselli
10,843,364 B2 11/2020 Volkl et al.
10,850,416 B2 12/2020 Schmeiser et al.
10,863,751 B2 12/2020 Blaine
10,869,489 B2 12/2020 Blaine et al.
10,875,207 B2 12/2020 Volkl et al.
11,009,472 B2 5/2021 Von Keudell et al.
11,014,257 B2 5/2021 Sunter et al.
11,202,452 B2 12/2021 Hofmann et al.
2001/0036807 A1 11/2001 Veldkamp et al.
2002/0004366 A1 1/2002 Thorvaldsson et al.
2003/0008608 A1 1/2003 Scalia et al.
2004/0029514 A1 2/2004 Kruger
2004/0108645 A1 6/2004 Lindelof et al.
2004/0194605 A1 10/2004 Weber
2004/0200365 A1 10/2004 Young
2004/0231526 A1 11/2004 Childress et al.
2005/0032471 A1 2/2005 Pfarr et al.
2005/0085176 A1 4/2005 Houtz
2005/0188657 A1 9/2005 Drebing et al.
2005/0199111 A1 9/2005 Sandberg et al.
2006/0154587 A1 7/2006 Mikkelsen et al.
2006/0156878 A1 7/2006 Faires et al.
2006/0162515 A1 7/2006 Vogeley et al.
2006/0171581 A1 8/2006 Blaine
2006/0205335 A1 9/2006 Bifulco
2006/0219069 A1 10/2006 Skaar et al.
2007/0028742 A1 2/2007 Mueller et al.
2007/0193425 A1 8/2007 Weber
2007/0202229 A1 8/2007 Nielsen
2007/0264397 A1 11/2007 Mather et al.
2008/0016999 A1 1/2008 Mathues et al.
2008/0200107 A1 8/2008 Christensen et al.
2008/0212842 A1 9/2008 Burton
2008/0281461 A1 11/2008 Blaine et al.
2009/0035434 A1 2/2009 Sverrisson et al.
2009/0038455 A1 2/2009 Strong et al.
2009/0064833 A1 3/2009 Sandberg et al.
2009/0137195 A1 5/2009 Bottemiller et al.
2009/0246333 A1 10/2009 Groneberg et al.
2010/0066824 A1 3/2010 Burton
2010/0116107 A1 5/2010 Spillner et al.
2010/0170373 A1 7/2010 Green
2010/0179684 A1 7/2010 Blaine et al.
2010/0267320 A1 10/2010 Weber
2010/0304652 A1 12/2010 Bolte et al.
2010/0307303 A1 12/2010 Weber
2011/0111682 A1 5/2011 Schimitzek
2011/0126679 A1 6/2011 Weber
2011/0126680 A1 6/2011 Weber
2011/0150604 A1 * 6/2011 Marsh .................. B26D 7/2614
29/525.01
2011/0154969 A1 6/2011 Weber
2011/0179922 A1 7/2011 Weber
2011/0185865 A1 8/2011 Weber
2011/0203434 A1 8/2011 Reifenhaeuser
2011/0247466 A1 10/2011 Weber
2011/0247470 A1 10/2011 Weber
2011/0265621 A1 11/2011 Schmidt
2011/0311700 A1 12/2011 Shah et al.
2012/0018353 A1 1/2012 McKenna et al.
2012/0040597 A1 2/2012 Fern et al.
2012/0060659 A1 3/2012 Weber
2012/0073415 A1 3/2012 Maidel et al.
2012/0115406 A1 5/2012 Fillenworth et al.
2012/0137844 A1 6/2012 Weber
2012/0137845 A1 6/2012 Weber
2012/0198974 A1 8/2012 Weber
2012/0198975 A1 8/2012 Lindee
2012/0212603 A1 8/2012 Lindee et al.
2013/0068076 A1 3/2013 Schmeiser et al.
2013/0074667 A1 3/2013 Weber et al.
2013/0133490 A1 5/2013 Schmeiser et al.
2013/0260660 A1 10/2013 Reifenhaeuser
2014/0338509 A1 11/2014 Lindee et al.
2015/0093488 A1 4/2015 Gutmann et al.
2015/0122100 A1 5/2015 Schmeiser
2015/0150272 A1 6/2015 Peters et al.
2015/0190939 A1 7/2015 Gerlach et al.
2015/0205288 A1 7/2015 Strong et al.
2015/0216192 A1 8/2015 Jacobsen et al.
2015/0290827 A1 * 10/2015 Evans .................. A01G 3/0435
83/698.11
2015/0367523 A1 12/2015 Schmeiser et al.
2016/0088852 A1 3/2016 Lindee et al.
2016/0207152 A1 7/2016 Weber
2017/0035066 A1 2/2017 Hukelmann
2017/0156354 A1 6/2017 Inoue et al.
2017/0210023 A1 7/2017 Hocker et al.
2017/0212506 A1 7/2017 Pfarr et al.
2017/0217044 A1 8/2017 Blaine
2017/0245509 A1 8/2017 Petersen et al.
2017/0320225 A1 11/2017 Fox et al.
2017/0368707 A1 12/2017 Keller
2018/0027848 A1 2/2018 Blaine et al.
2018/0029246 A1 2/2018 Blaine et al.
2018/0158537 A1 6/2018 Blaine
2018/0207896 A1 7/2018 Olson et al.
2019/0009421 A1 1/2019 Grasselli
2019/0152084 A1 5/2019 Schmeiser
2020/0068908 A1 3/2020 Blaine
2020/0068909 A1 3/2020 Blaine et al.
2020/0108520 A1 4/2020 Pryor et al.
2020/0238556 A1 7/2020 Blaine et al.
2020/0269459 A1 * 8/2020 Fox ...................... B26D 7/0625
2020/0315191 A1 10/2020 Hofmann et al.

(56) References Cited

U.S. PATENT DOCUMENTS

| | | | | |
|---|---|---|---|---|
| 2020/0338777 | A1 | 10/2020 | Beliveau et al. | |
| 2021/0001507 | A1 | 1/2021 | Zambarda | |
| 2021/0092968 | A1 | 4/2021 | Blaine | |
| 2023/0129471 | A1* | 4/2023 | Torrenga | B26D 7/0641 83/13 |
| 2023/0211517 | A1* | 7/2023 | Su | B26D 3/169 83/452 |
| 2024/0058981 | A1* | 2/2024 | Stachel | B26D 7/34 |

FOREIGN PATENT DOCUMENTS

| | | | |
|---|---|---|---|
| AU | 2013301673 | B2 | 12/2016 |
| AU | 2012267912 | B2 | 12/2019 |
| CA | 2039045 | A1 | 9/1991 |
| CA | 2006994 | C | 9/1992 |
| CA | 2133953 | A1 | 11/1993 |
| CA | 1328856 | C | 4/1994 |
| CA | 2158625 | A1 | 3/1996 |
| CA | 2377198 | A1 | 9/2002 |
| CA | 2200545 | C | 1/2003 |
| CA | 2525674 | A1 | 12/2004 |
| CA | 2531621 | A1 | 6/2006 |
| CA | 2531626 | A1 | 6/2006 |
| CA | 2531857 | A1 | 6/2006 |
| CA | 2541555 | A1 | 10/2006 |
| CA | 2550972 | A1 | 12/2006 |
| CA | 2664348 | A1 | 5/2008 |
| CA | 2511654 | C | 6/2009 |
| CA | 2708216 | A1 | 6/2009 |
| CA | 2767423 | A1 | 1/2011 |
| CA | 2779326 | A1 | 5/2011 |
| CA | 3013395 | A1 | 5/2011 |
| CA | 2783818 | A1 | 6/2011 |
| CA | 2738300 | A1 | 10/2011 |
| CA | 2552307 | C | 1/2012 |
| CA | 2531852 | C | 2/2013 |
| CA | 2531863 | C | 2/2013 |
| CA | 2743418 | C | 4/2013 |
| CA | 2531895 | C | 8/2013 |
| CA | 2695808 | C | 11/2015 |
| CA | 2877448 | C | 10/2016 |
| CA | 2904958 | A1 | 3/2017 |
| CA | 2706407 | C | 5/2017 |
| CA | 3032041 | A1 | 2/2018 |
| CA | 2899291 | C | 3/2018 |
| CA | 2778724 | C | 9/2018 |
| CA | 3108061 | A1 | 3/2020 |
| CA | 3032196 | C | 10/2020 |
| CA | 3137380 | A1 | 11/2020 |
| CN | 105979784 | A | 9/2016 |
| DE | 2843388 | A1 | 6/1979 |
| DE | 8128596 | U1 | 3/1982 |
| DE | 3100901 | A1 | 8/1982 |
| DE | 68903375 | T2 | 3/1993 |
| DE | 10220006 | A1 | 11/2003 |
| DE | 102004010696 | A1 | 9/2005 |
| DE | 60305523 | T2 | 8/2007 |
| DE | 102010021951 | A1 | 12/2011 |
| DE | 102012107278 | A1 | 2/2014 |
| DE | 102019110313 | B3 | 7/2020 |
| DK | 201570224 | A1 | 4/2015 |
| EP | 0101264 | A2 | 2/1984 |
| EP | 0057478 | B1 | 4/1986 |
| EP | 0332895 | A2 | 9/1989 |
| EP | 341564 | A1 | 11/1989 |
| EP | 0373844 | A1 | 6/1990 |
| EP | 0449512 | A1 | 10/1991 |
| EP | 0637278 | A1 | 2/1995 |
| EP | 587870 | B1 | 2/1996 |
| EP | 0377451 | B1 | 4/1997 |
| EP | 690773 | B1 | 2/1998 |
| EP | 1064518 | A2 | 1/2001 |
| EP | 1174034 | A1 | 1/2002 |
| EP | 1243386 | A2 | 9/2002 |
| EP | 0971595 | B1 | 2/2003 |
| EP | 1211944 | B1 | 9/2004 |
| EP | 1429898 | B1 | 5/2005 |
| EP | 1356906 | B1 | 8/2005 |
| EP | 1626622 | A2 | 2/2006 |
| EP | 1555882 | B1 | 5/2006 |
| EP | 1782929 | A2 | 5/2007 |
| EP | 1289374 | B1 | 7/2007 |
| EP | 2084968 | A1 | 8/2009 |
| EP | 2094102 | A1 | 9/2009 |
| EP | 1781110 | B1 | 2/2010 |
| EP | 2210495 | A1 | 7/2010 |
| EP | 2230920 | A2 | 9/2010 |
| EP | 2266766 | A2 | 12/2010 |
| EP | 1178878 | B2 | 5/2011 |
| EP | 2341313 | A1 | 7/2011 |
| EP | 2352381 | A2 | 8/2011 |
| EP | 2353391 | A1 | 8/2011 |
| EP | 1583640 | B1 | 10/2011 |
| EP | 1820614 | B1 | 10/2011 |
| EP | 2258523 | B1 | 11/2011 |
| EP | 1552912 | B1 | 2/2012 |
| EP | 2190637 | B1 | 2/2012 |
| EP | 2272640 | B1 | 2/2012 |
| EP | 2452168 | A1 | 5/2012 |
| EP | 2509454 | A2 | 10/2012 |
| EP | 2450166 | B1 | 11/2012 |
| EP | 2572840 | A2 | 3/2013 |
| EP | 2572841 | A2 | 3/2013 |
| EP | 2572842 | A2 | 3/2013 |
| EP | 2625959 | A2 | 8/2013 |
| EP | 2516118 | B1 | 11/2013 |
| EP | 2664425 | A2 | 11/2013 |
| EP | 2531038 | B1 | 12/2013 |
| EP | 2644337 | B1 | 3/2014 |
| EP | 1915240 | B1 | 4/2014 |
| EP | 2029330 | B1 | 4/2014 |
| EP | 2755018 | A1 | 7/2014 |
| EP | 2618962 | B1 | 8/2014 |
| EP | 2493765 | B1 | 10/2014 |
| EP | 2809454 | A1 | 12/2014 |
| EP | 2435220 | B1 | 7/2015 |
| EP | 2537651 | B1 | 10/2015 |
| EP | 2829372 | B1 | 12/2015 |
| EP | 2341313 | B1 | 3/2016 |
| EP | 2796255 | B1 | 5/2016 |
| EP | 2835236 | B1 | 6/2016 |
| EP | 3069836 | A1 | 9/2016 |
| EP | 2359992 | B2 | 12/2016 |
| EP | 2444213 | B1 | 1/2017 |
| EP | 1534478 | B1 | 3/2017 |
| EP | 2437920 | B1 | 5/2017 |
| EP | 3170632 | A1 | 5/2017 |
| EP | 3069835 | B1 | 11/2017 |
| EP | 2315650 | B1 | 12/2017 |
| EP | 3275313 | A1 | 1/2018 |
| EP | 2439029 | B1 | 4/2018 |
| EP | 2882296 | B1 | 4/2018 |
| EP | 2885115 | B1 | 4/2018 |
| EP | 3160241 | B1 | 10/2018 |
| EP | 3386691 | A1 | 10/2018 |
| EP | 2494307 | B1 | 12/2018 |
| EP | 3424332 | A1 | 1/2019 |
| EP | 3483553 | A1 | 5/2019 |
| EP | 3305696 | B1 | 7/2019 |
| EP | 3224005 | B1 | 8/2019 |
| EP | 3238898 | B1 | 10/2019 |
| EP | 2414140 | B1 | 11/2019 |
| EP | 1782929 | B2 | 12/2019 |
| EP | 3578917 | A1 | 12/2019 |
| EP | 3332928 | B1 | 1/2020 |
| EP | 3424332 | B1 | 1/2020 |
| EP | 3392847 | B1 | 2/2020 |
| EP | 3689563 | A1 | 8/2020 |
| EP | 3448643 | B1 | 9/2020 |
| EP | 3448642 | B1 | 10/2020 |
| EP | 2895308 | B1 | 1/2021 |
| EP | 3760368 | A1 | 1/2021 |
| EP | 3490383 | B1 | 5/2021 |

(56) References Cited

FOREIGN PATENT DOCUMENTS

| | | | |
|---|---|---|---|
| EP | 3174666 | B1 | 7/2021 |
| EP | 3843549 | A1 | 7/2021 |
| EP | 3386692 | B1 | 9/2021 |
| EP | 3888864 | A1 | 10/2021 |
| EP | 3900899 | A1 | 10/2021 |
| EP | 2844440 | B2 | 11/2021 |
| EP | 3448641 | B1 | 9/2022 |
| GB | 483604 | A | 4/1938 |
| GB | 2075459 | A | 11/1981 |
| GB | 2377362 | A | 1/2003 |
| GB | 2364894 | A | 7/2010 |
| JP | 2007522948 | A | 8/2007 |
| JP | 5025271 | B2 | 9/2012 |
| KR | 20100101880 | A | 9/2010 |
| KR | 101025501 | B1 | 4/2011 |
| KR | 20190005814 | A | 1/2019 |
| KR | 102018637 | B1 | 9/2019 |
| MX | 2017003541 | A | 10/2017 |
| WO | WO9322114 | A1 | 11/1993 |
| WO | WO9947885 | A2 | 9/1999 |
| WO | WO200062983 | A1 | 10/2000 |
| WO | WO2001032369 | A1 | 5/2001 |
| WO | WO200328963 | A1 | 4/2003 |
| WO | WO200359585 | A2 | 7/2003 |
| WO | WO2004105519 | A2 | 12/2004 |
| WO | WO2004106020 | A1 | 12/2004 |
| WO | WO2006080033 | A1 | 8/2006 |
| WO | WO2006136814 | A1 | 12/2006 |
| WO | WO2007022782 | A2 | 3/2007 |
| WO | WO2007096363 | A1 | 8/2007 |
| WO | WO2008057732 | A1 | 5/2008 |
| WO | WO2009079173 | A2 | 6/2009 |
| WO | WO2010054332 | A2 | 5/2010 |
| WO | WO2011072187 | A2 | 6/2011 |
| WO | WO2012161577 | A1 | 11/2012 |
| WO | WO2013113518 | A1 | 8/2013 |
| WO | WO2013135264 | A1 | 9/2013 |
| WO | WO2013148322 | A1 | 10/2013 |
| WO | WO2014023626 | A2 | 2/2014 |
| WO | WO201460340 | A1 | 4/2014 |
| WO | WO2015092935 | A1 | 6/2015 |
| WO | WO2015114118 | A1 | 8/2015 |
| WO | WO2015193507 | A1 | 12/2015 |
| WO | WO2016045683 | A1 | 3/2016 |
| WO | WO2017133972 | A1 | 8/2017 |
| WO | WO2017186826 | A1 | 11/2017 |
| WO | WO2018111108 | A2 | 6/2018 |
| WO | WO2020046868 | A1 | 3/2020 |
| WO | WO2020212246 | A1 | 10/2020 |
| WO | WO2020225529 | A1 | 11/2020 |

* cited by examiner

RELEASABLE SIDE STRAPPING ASSEMBLY FOR A FOOD PRODUCT SLICING APPARATUS

CROSS-REFERENCE TO RELATED APPLICATION

This application claims the priority of U.S. provisional application Ser. No. 63/271,459, filed on Oct. 25, 2021, the contents of which are incorporated herein in its entirety.

FIELD OF THE DISCLOSURE

The present disclosure generally relates to a side strapping assembly for a food product slicing apparatus which is used to slice food products, and more particularly to a side strapping assembly that can be released from the food product slicing apparatus without the use of tools.

BACKGROUND

Bacon bellies are often unshaped which is not ideal for slicing. The unshaped bacon bellies can result in nonconforming slices exiting the slicer which cannot be used for consumption. As a result, the yield of the bacon belly is reduced. Additionally, unshaped parts produce scrap on the slicer, result in significant grading effort, and reduce throughput on the slicer.

Prior slicing apparatus which include an assembly for side strapping bacon bellies have the side strapping assembly bolted thereon such that it is time consuming to remove the side strapping assembly in order to clean the slicing apparatus. In addition, prior slicing apparatus which includes a side strapping assembly for side strapping bacon bellies typically cut to a fixed width of the bacon belly. This results in predefined, uniform side strapping. With prior machines, it is typically not possible to individually cut the sides with respect to the shape to optimize the bacon belly for maximum yield on the slicer.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

Figure 1:
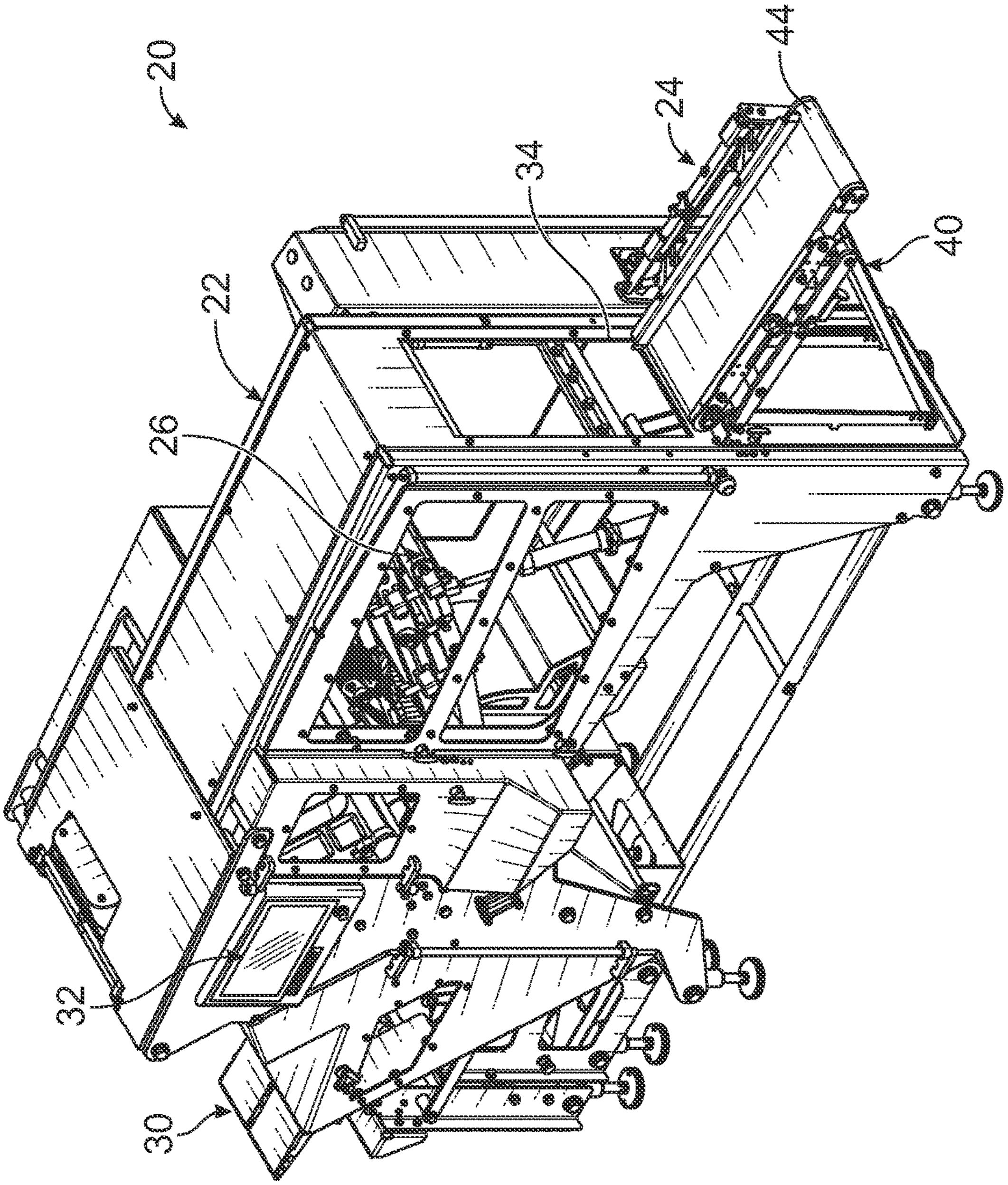
FIG. 1 depicts a rear perspective view of a food product slicing apparatus.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Food product slicing apparatuses and methods associated with the same are included in the present disclosure. With reference to the figures, one example of a food product slicing apparatus 20 having a side strapping assembly 108 is shown. The food product slicing apparatus 20 is used to slice food products into slices. The food products may be comprised of a wide variety of edible materials including, but not limited to meat, such as pork bellies, beef, chicken, fish, etc., and cheese.

Figure 2:
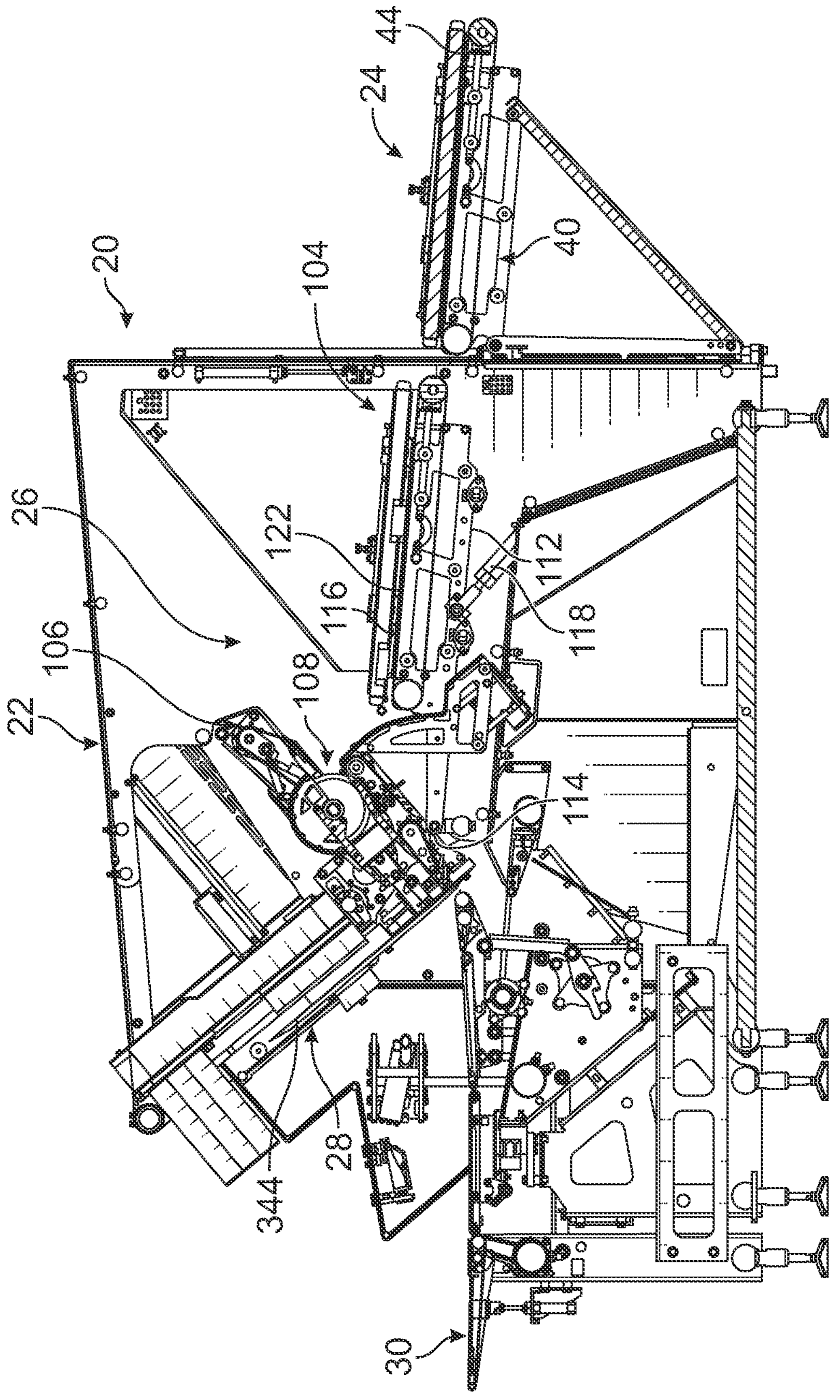
FIG. 2 depicts a cross-sectional view of the food product slicing apparatus with a loading tray assembly of a feed assembly of the food product slicing apparatus in a lowered position.
Figure 3:
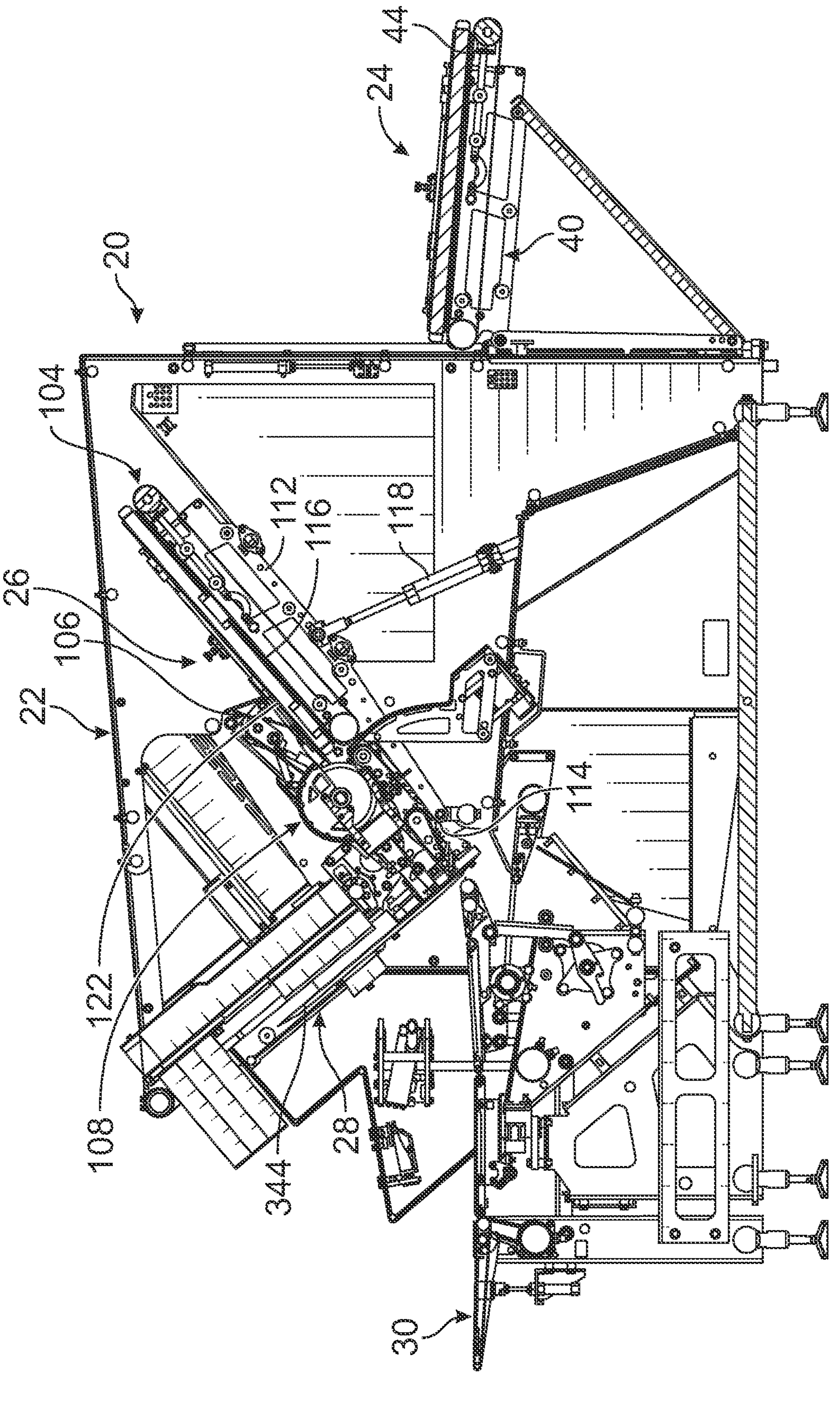
FIG. 3 depicts a cross-sectional view of the food product slicing apparatus with the loading tray assembly in a raised position.
Figure 4:
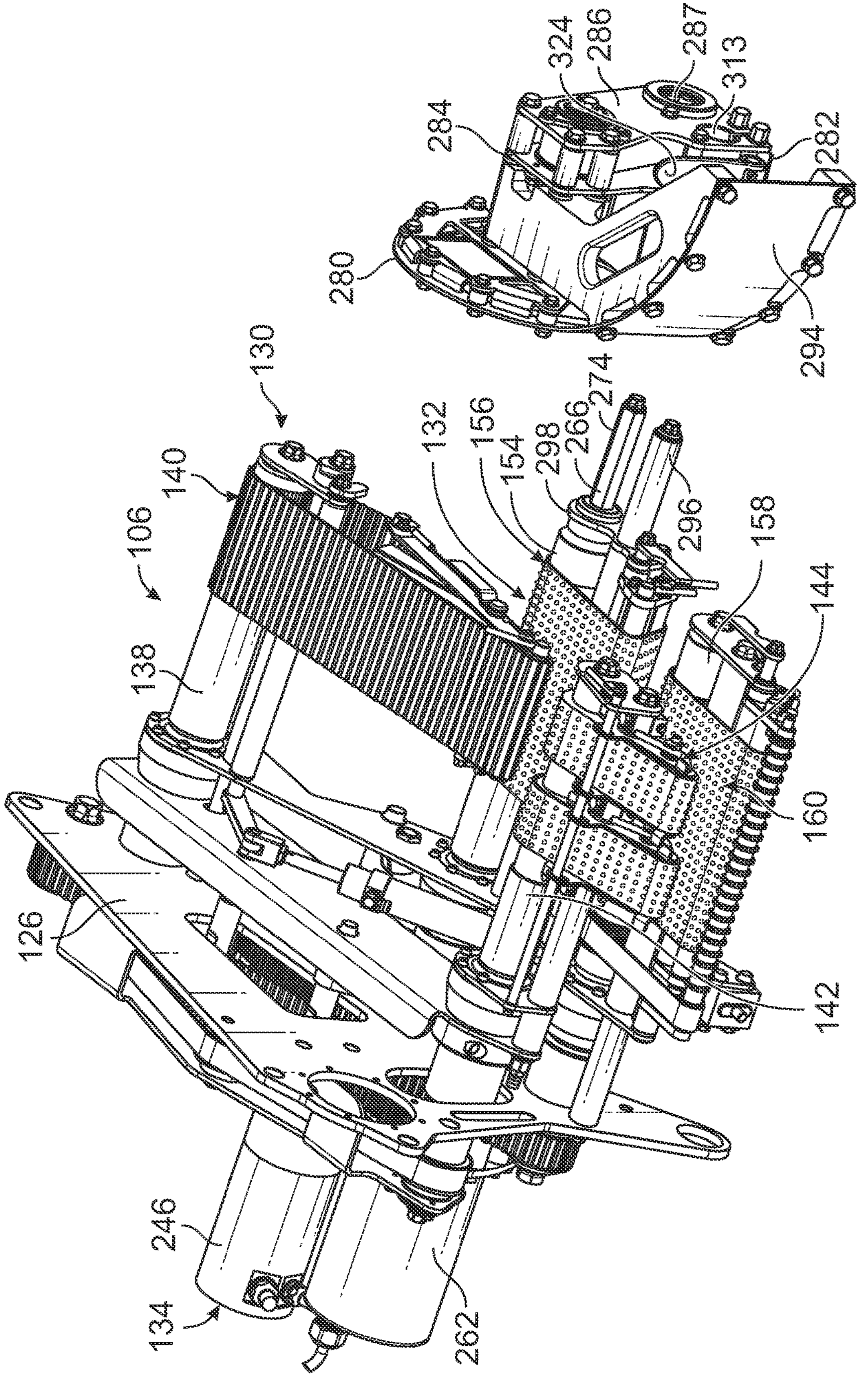
FIG. 4 depicts a front perspective view of a drive assembly of the food product slicing apparatus.
Figure 5:
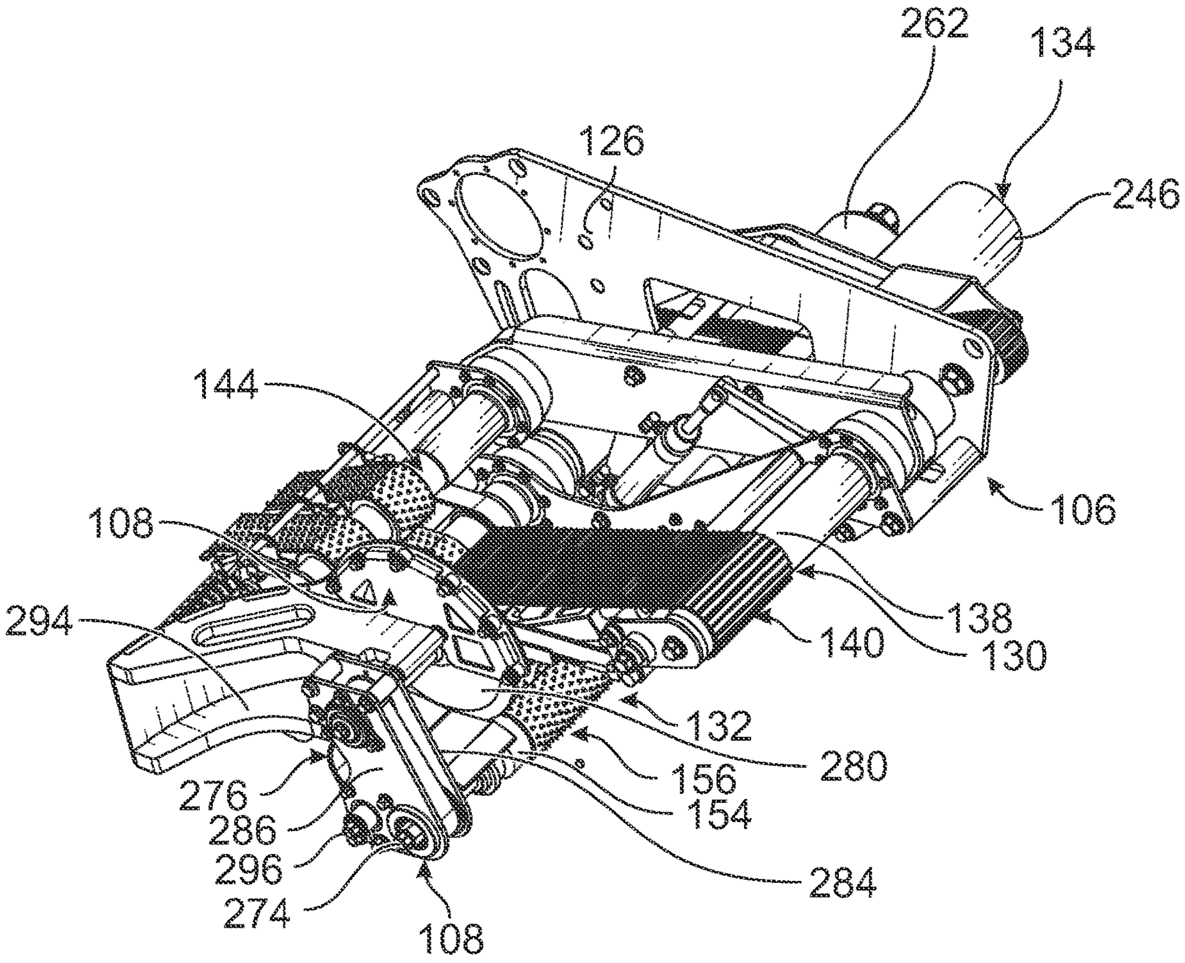
FIG. 5 depicts a rear perspective view of the drive assembly and of a side strapping assembly.
Figure 6:
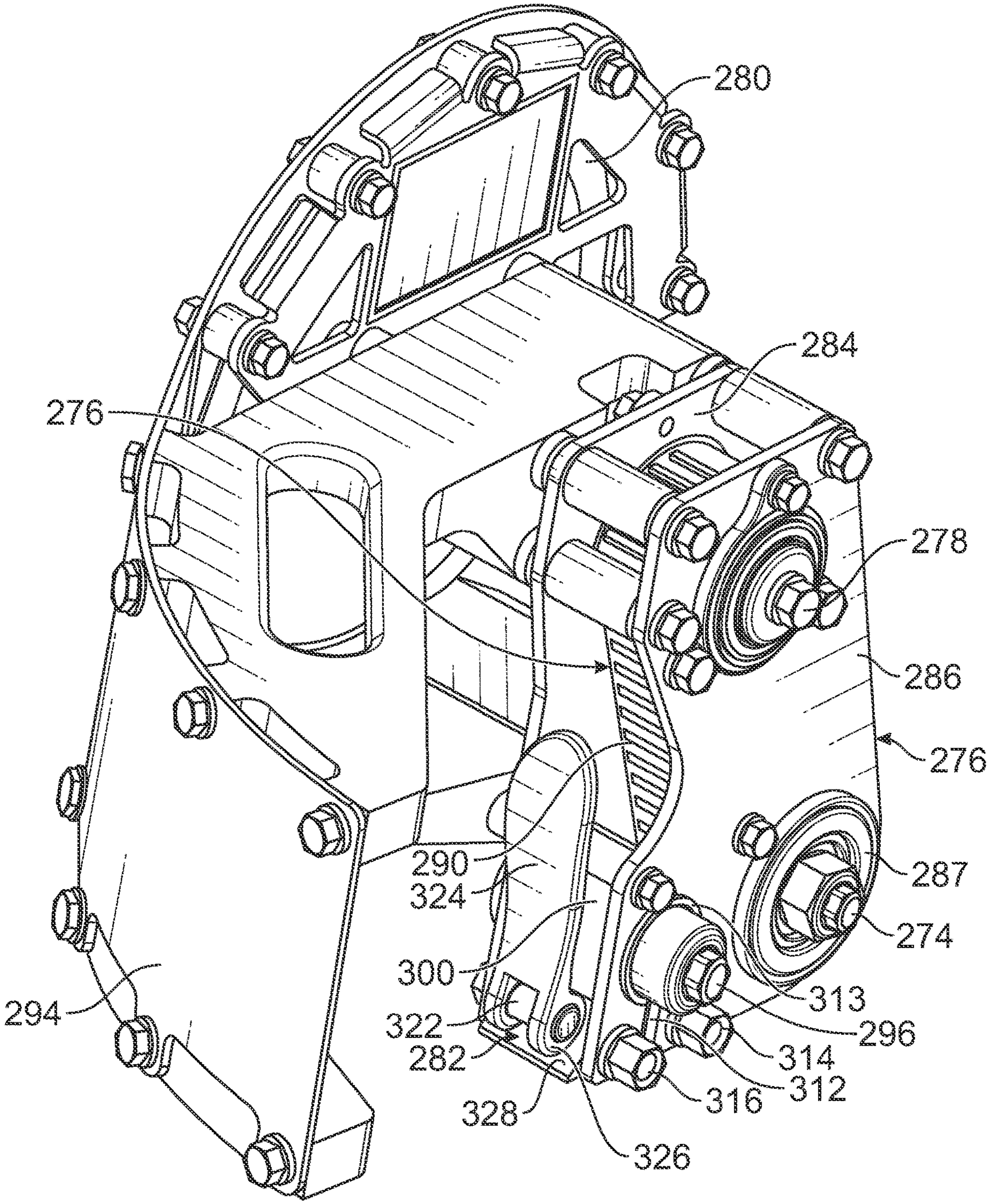
FIG. 6 depicts a front perspective view of a portion of the side strapping assembly.

As generally shown in FIGS. 1-3, the food product slicing apparatus 20 includes a main frame 22, a load assembly 24 mounted on the main frame 22, a feed assembly 26 mounted on the main frame 22 forward of the load assembly 24, the side strapping assembly 108 mounted on the main frame 22 proximate to the feed assembly 26, a slicing assembly 28 including a slicing blade 344 rotatably mounted on the main frame 22 forward of the feed assembly 26, and an output assembly 30 mounted on the main frame 22 forward of the slicing assembly 28. The food product slicing apparatus 20 further includes a control system 32 configured to control operation of the components of the food product slicing apparatus 20. The main frame 22 supports the load assembly 24, the feed assembly 26, the slicing assembly 28, and the output assembly 30 on a ground surface and includes various mechanisms and power systems for powering the food product slicing apparatus 20. The load assembly 24 and the feed assembly 26 are configured to support and handle the food products and to move the food products to the slicing assembly 28. The slicing assembly 28 is configured to slice the food products into individual slices. The sliced food product is supported on the output assembly 30, which may be a conveyor, in stacks or in shingles and moved away from the slicing assembly 28. The control system 32 includes all the necessary hardware and software to perform all of the operations and functions of the food product slicing apparatus 20. The control system 32 may be mounted on the main frame 22 or may be remote from the main frame 22.

In an embodiment, and as shown, the load assembly 24 includes a loading frame 40 on which a conveyor 44 is provided. Other load assemblies 24 may be provided.

The feed assembly 26 includes a loading tray assembly 104 mounted on the main frame 22 forward of the load assembly 24, a drive assembly 106 mounted on the main frame 22 forward of the loading tray assembly 104, and the side strapping assembly 108. The loading tray assembly 104 moves food products from the load assembly 24 to the drive assembly 106, and the drive assembly 106 moves food products to the slicing assembly 28. The side strapping assembly 108 side straps the food product along one side thereof prior to entry into the slicing assembly 28. As shown in FIGS. 2 and 3, the loading tray assembly 104 includes a longitudinally extending support frame 112 having a front end pivotally attached to the main frame 22 at a pivot 114, a conveyor 116 mounted on an upper side of the support frame 112, and an actuator 118 for lifting or lowering the support frame 112 and the conveyor 116. The actuator 118 may be pneumatic cylinder. The conveyor 116 includes an endless belt wrapped around a plurality of wheels, with at least one of the wheels being a drive wheel or being driven by a separate drive wheel. The endless belt defines a planar upper surface 122 upon which food products will translate. The loading tray assembly 104 is pivotable between a lowered position, see FIG. 2, in which the conveyor 116 is aligned with the conveyor 44 of the load assembly 24 to receive food products thereon, and a raised position, see FIG. 3, in which the conveyor 116 is aligned with the drive assembly 106.

The main frame 22 includes a drive frame plate 126 which is cantilevered therefrom. The drive assembly 106 includes an upper drive assembly 130 cantilevered from the drive frame plate 126, a lower drive assembly 132 cantilevered from the drive frame plate 126, and a motor assembly 134 coupled to the drive frame plate 126 and to the upper and lower drive assemblies 130, 132. In an embodiment, the motor assembly 134 include gears and belts for coupling to and driving the upper and lower drive assemblies 130, 132. The drive frame plate 126 extends parallel to the longitudinal axis of the food product slicing apparatus 20. The upper drive assembly 130 includes at least conveyor and the lower drive assembly 132 includes at least conveyor. The conveyors may include endless belts wrapped around a plurality of shaft mounted wheels. The endless belts defines a planar surfaces upon which food products will translate. As shown in in an embodiment, the upper drive assembly 130 includes a rear conveyor 140 mounted on a rear shaft 138, and a front conveyor 144 mounted on a front shaft 142. The front end of the rear conveyor 140 is proximate to, but spaced from, the rear end of the front conveyor 144 such that a gap is formed therebetween. The lower drive assembly 132 includes a rear conveyor 156 mounted on a rear shaft 154, and a front conveyor 160 mounted on a front shaft 158. The front end of the rear conveyor 156 is proximate to, but spaced from, the rear end of the front conveyor 160 such that a gap is formed therebetween. The rear conveyor 140 is partially positioned over the rear conveyor 156 and the front ends of the conveyors 140, 156 generally align. The rear end of the rear conveyor 140 is rearward of the rear end of the rear conveyor 156. The front conveyor 144 is positioned over the front conveyor 160 and the rear ends and the front ends of the conveyors 144, 160 generally align. The gaps are generally vertically aligned. When the loading tray assembly 104 is moved to the raised position, the front end **116*b* of the conveyor 116 is underneath the rear conveyor 140 and proximate to the rear end of the rear conveyor 156**.

The motor assembly 134 includes a motor 246 which is coupled to the shafts 138, 142, 154, 158 to drive the conveyors 140, 144, 156, 160. A single motor 246 may be provided to drive all of the conveyors 140, 144, 156, 160 at the same speed. If only a single motor 246 is used, the cost and complexity of the food product slicing apparatus 20 is reduced.

The side strapping assembly 108, see FIGS. 5-10, is positioned proximate to the rear conveyor 156 on a shaft 296 that extends from the drive frame plate 126. The side strapping assembly 108 includes a motor 262 having a motor shaft **262*a* affixed to a gear 264 mounted on the drive frame plate 126, a rotatable shaft 266 extending from the drive frame plate 126, a gear 268 affixed to the end of the shaft 266, a belt 270 coupling the gears 264, 268 together for co-rotation, a blade driving assembly 276 releasably mounted on an outboard end 274 of the shaft 266, and having a side strapping blade 280 mounted on a driving shaft 278 which is coupled to the blade driving assembly 276, a plate 298 mounted on the outboard end of the shaft 266, and a clamp 282 mounted on a cylindrical portion of the shaft 296 for releasably coupling the blade driving assembly 276, the driving shaft 278 and the side strapping blade 280 to the shaft outboard end 274 and to the shaft 296. The shaft 296 passes through the rear conveyor 156 and through the blade driving assembly 276. In an embodiment, the shaft 266 extends through the shaft 154 and is rotatable relative to the shaft 154, and the shaft outboard end 274 extends outward from the shaft 154. The shaft 296 is parallel to the shafts 154, 266 and may be coupled thereto by a plate 298 having a bearing surrounding shaft 154. The plate 298 is affixed to the shaft 296. The shaft 296 and the plate 298 form a part of the main frame 22**.

The shaft outboard end 274 has a non-circular profile, and may be hexagonal. The side strapping blade 280 is positioned to the outboard side of the rear conveyor 156 opposite to the side on which the drive frame plate 126 and the motor 262 are provided. The axis of rotation of the side strapping blade 280 provided by the driving shaft 278 is transverse to the longitudinal axis of the rear conveyor 156, and the side strapping blade 280 is parallel to the longitudinal axis of the rear conveyor 156.

The blade driving assembly 276 includes first and second plates 284, 286 which are spaced apart from each other. The shaft outboard end 274 extends through the plates 284, 286 and is coupled thereto by bearings 287. The blade driving assembly 276 further includes a toothed gear 288 affixed to the shaft outboard end 274 and which is positioned between the plates 284, 286. The toothed gear 288 is mounted for co-rotation with the shaft outboard end 274. The blade driving assembly 276 further includes a drive belt 290 looped around the toothed gear 288 and a toothed gear 292 affixed to the blade shaft 278. When the motor 262 is driven, the gear 264 on the motor shaft **262*a* drives the belt 270, which rotates the gear 268 and the shaft 266, which rotates the gear 288 and the drive belt 290, which rotates the gear 292, the blade shaft 278 and the side strapping blade 280. The side strapping blade 280 cuts a side portion of the food product with which the side strapping blade 280 engages. A chute 294 is mounted between the side strapping blade 280 and the plate 284** which collects the trim cut from the food product during the side strapping and provides a path for disposal of the trim.

The clamp 282 is coupled to the shaft 296. The clamp 282 includes a split ring 300 between the first and second plates 284, 286, and a handle 302 mounted to the split ring 300. The split ring 300 is mounted on a cylindrical portion of the shaft 296. The split ring 300 includes an encircling portion 304 that partially encircles the cylindrical portion of the shaft 296, a rear end portion 306, and a front end portion 308. The end portions 306, 308 are spaced apart from each other by a space 310. The space 310 is parallel to the axis of the shaft 296. Each plate 284, 286 has a split 312 which extends from the opening 313 through which the shaft 296 extends to a bottom end of the plate 284, 286. The splits 312 in the plates 284, 286 align with the space 310 between the end portions 306, 308 of the split ring 300. The end portions 306, 308 of the split ring 300 are coupled to each plate 284, 286 by fasteners 314, 316. The end portions 306, 308 have aligned passageways 318, 320 therethrough which are perpendicular to the axis of the shaft 296 and open into the space 310. Passageway 318 is threaded, and passageway 320 is unthreaded. The handle 302 includes a pivotable grip portion 324 and a fastener 322 extended therefrom. The fastener 322 has a rounded head engaged with rounded head 326 of the pivotable grip portion 324 and a threaded shaft extending therefrom. The shaft of the fastener 322 is threadedly engaged with the wall forming the passageway 318 of the rear end portion 306, and passes through the unthreaded passageway 320 in the front end portion 308. The rounded head 326 seats within a cam surface 328 of the front end portion 308. A nut 330 is coupled to the rear end of the threaded shaft of the fastener 322.

Figure 7:
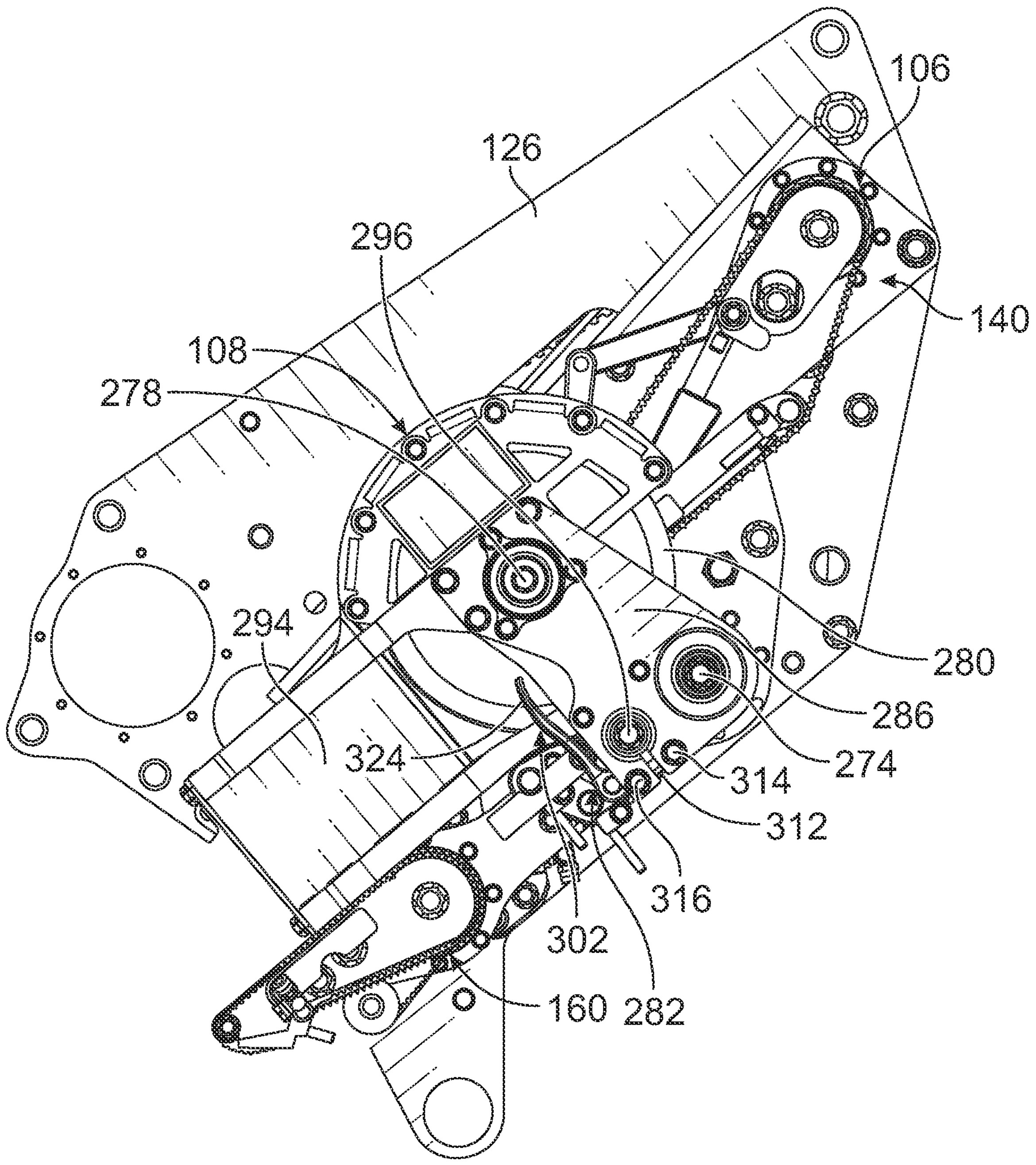
FIG. 7 depicts a first side elevational view of the drive assembly and the side strapping assembly.
Figure 8:
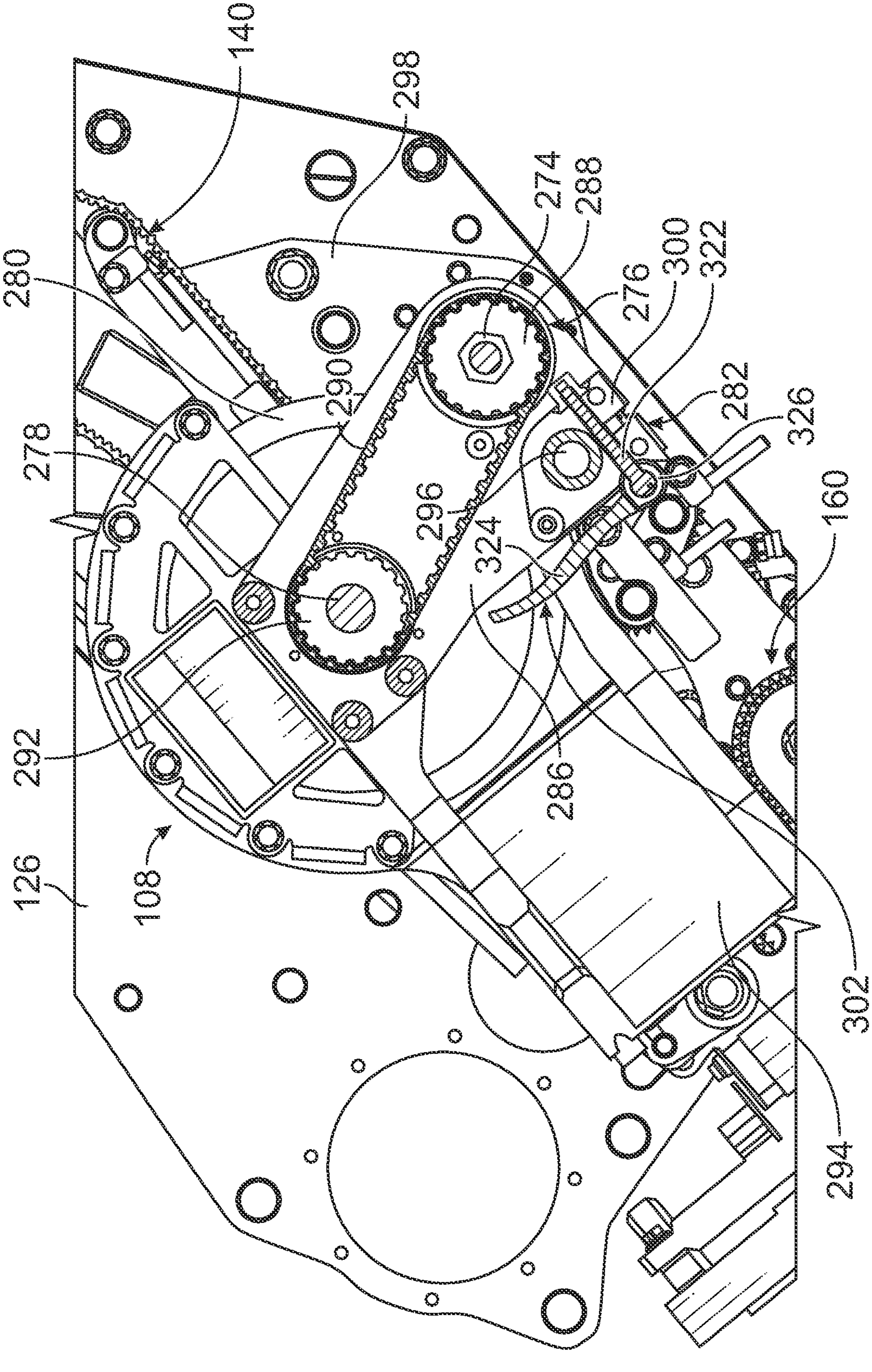
FIGS. 8 and 9 depict enlarged cross-sectional views of portions of the drive assembly and the side strapping assembly.
Figure 9:
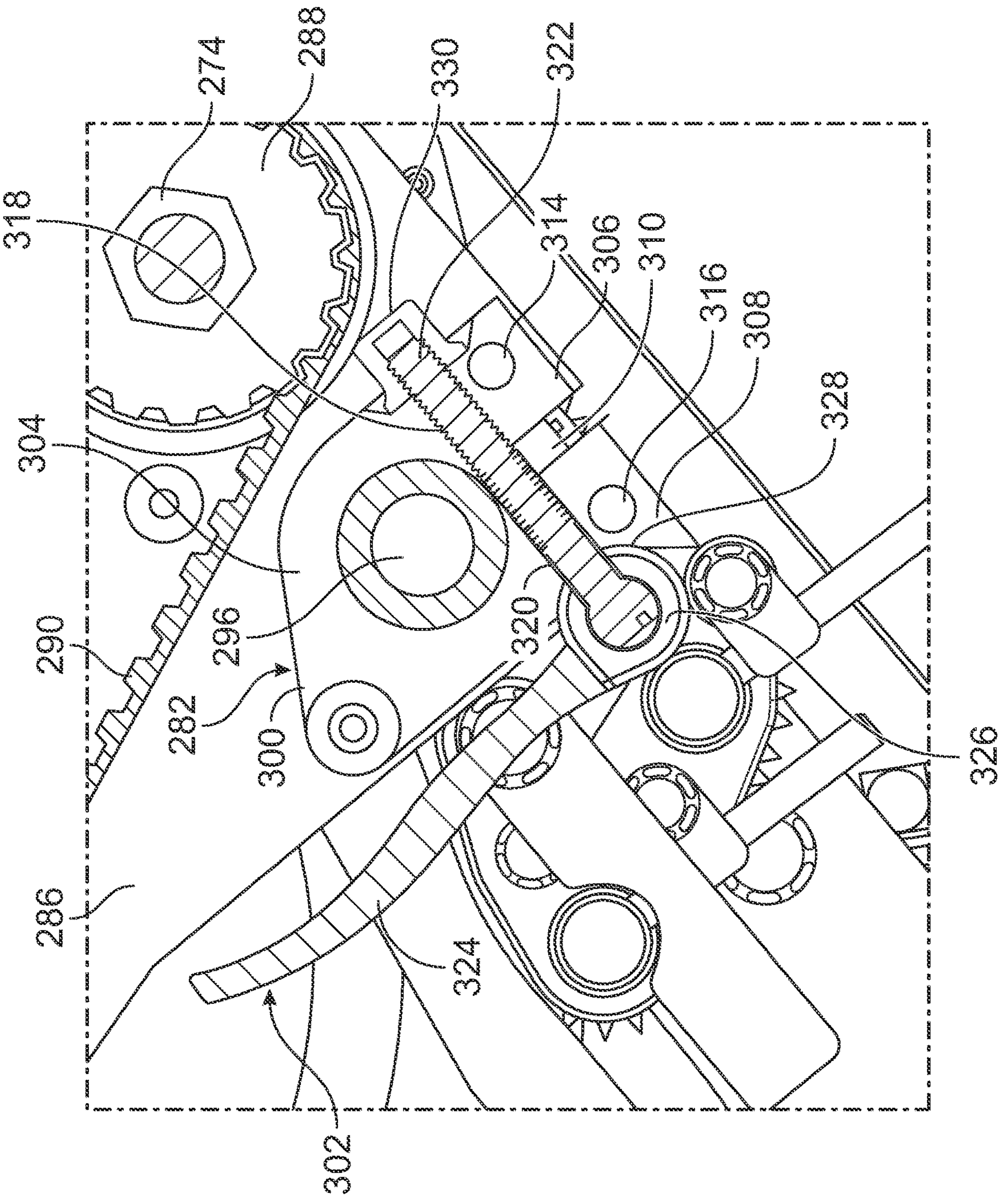
Figure 10:
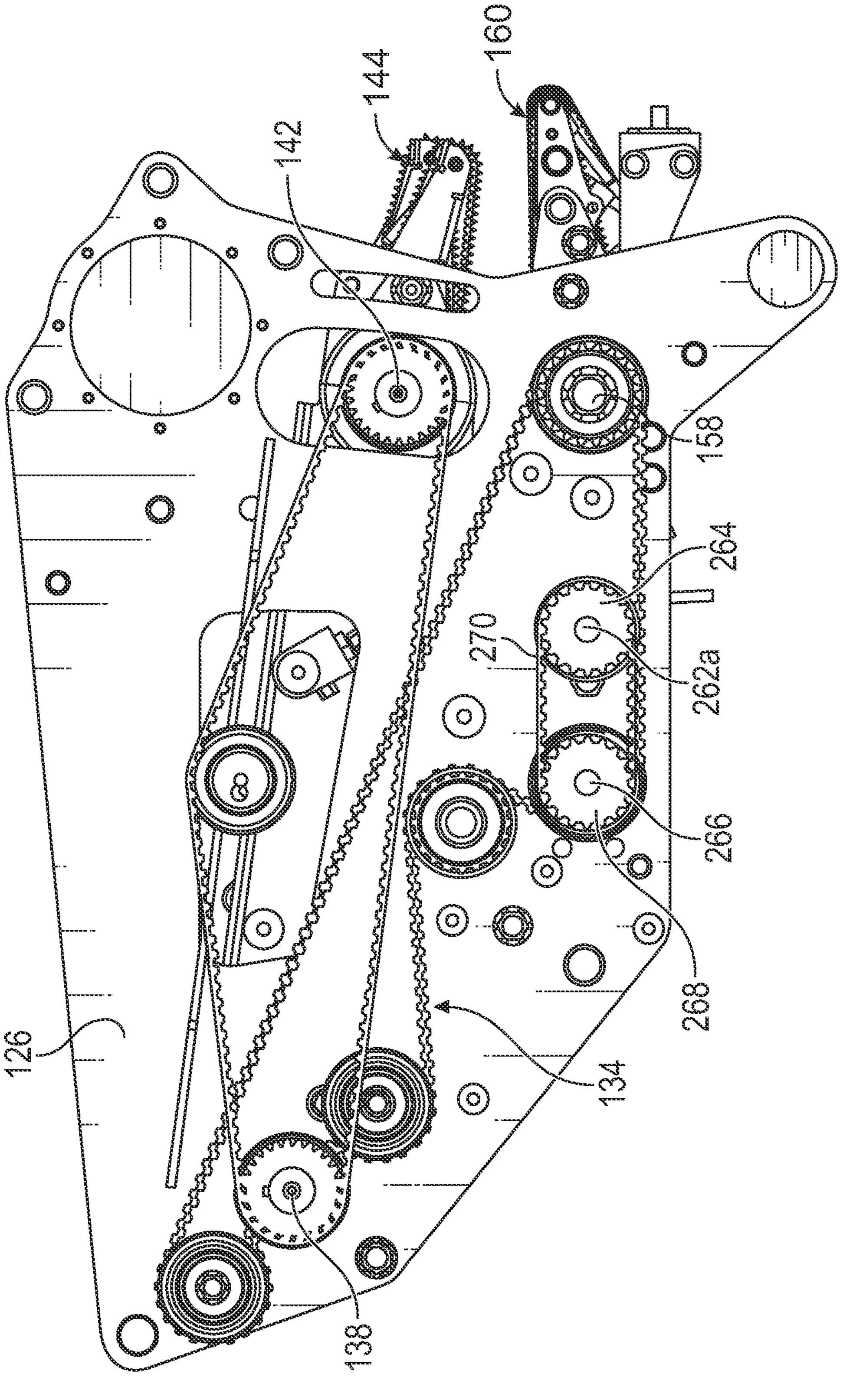
FIG. 10 depicts a second side elevational view of the drive assembly and the side strapping assembly.

When the grip portion 324 is in the position as shown in FIGS. 7-9, the clamp 282 is unlocked from the shaft 296. When the grip portion 324 is pivoted, the rounded head 326 moves along the cam surface 328 and relative to the rounded head of the fastener 322, which pulls the shaft of the fastener 322 along the unthreaded passageway 320 and causes the end portions 306, 308 to move toward each other to reduce the widths of the splits 312 and the space 310, thereby locking the clamp 282 onto the cylindrical portion of the shaft 296. When the grip portion 324 is rotated to the draw the end portions 306, 308 toward each other, the side strapping assembly 108 cannot be released from the shaft outboard end 274 since the split ring 300 firmly engages with the cylindrical portion of the shaft 296. When the grip portion 324 is rotated in the opposite direction to that shown in FIGS. 7-9, the rounded head 326 again moves along the cam surface 328, which pushes the shaft of the fastener 322 along the unthreaded passageway 320 and causes the end portions 306, 308 to move away from each other to increase the widths of the splits 312 and the space 310, thereby unlocking the clamp 282 from the cylindrical portion of the shaft 296. The blade driving assembly 276 is slid along the outboard end 274 of the shaft 266, and the split ring 300 is slid along the cylindrical portion of the shaft 296, thereby sliding the blade driving assembly 276, the driving shaft 278, the side strapping blade 280 and the clamp 282 off of the shafts 266, 296. These components of the side strapping assembly 108 can be released from the shaft outboard end 274 since the split ring 300 does not firmly grip the shaft 296. As a result, these components of the side strapping assembly 108 can be easily engaged with, or released from, the shaft outboard end 274 and the shaft 296 without the use of tools. When these components of the side strapping assembly 108 are released from the shaft outboard end 274 and the shaft 296, the side strapping assembly 108 can be serviced, and maintenance can be performed on the conveyors 140, 144, 156, 160.

The distance the side strapping blade 280 is from the rear conveyor 156 can be varied so as to vary the width of the side strapped food product by releasing the split ring 300 to increase the widths of the splits 312 and the space 310 and sliding the blade driving assembly 276, the driving shaft 278, the side strapping blade 280 and the clamp 282 along the lengths of the shafts 266, 296. After the desired position is reached, the split ring 300 is re-engaged to prevent the sliding movement of these components of the side strapping assembly 108 relative to the shaft outboard end 274 and the shaft 296.

While the side strapping assembly 108 is only shown and described as being on one side of the rear conveyor 156, a second side strapping assembly 108 can be provided on the other side of the rear conveyor 156 so that both sides of the food product can be side strapped.

In use, the food product is loaded on the load assembly 24 with the loading tray assembly 104 positioned in the lowered position. The conveyor 116 is activated to move the food product onto the loading tray assembly 104. Thereafter, the loading tray assembly 104 is moved to the raised position and the upper surface of the food product engages with the rear conveyor 140. The rear conveyor 140 and the conveyor 116 are activated to move the food product forward. The food product moves off of the conveyor 116 and onto the rear conveyor 156, while still being engaged by the rear conveyor 140. The food product is transported between the conveyors 140, 156 and the side strapping assembly 108 cuts the side of the food product as it moves along the conveyor 156. The cut side portion of the food product falls into the chute 294 and is taken away for further processing. Thereafter, the side strapped food product is sliced by the slicing blade 344 to cut the food product into individual slices. The individual slices fall onto the output assembly 30 for packaging.

While a particular embodiment is illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiment illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A food product slicing apparatus for slicing food products into slices comprising:

a frame;

a drive assembly mounted on the frame and configured to receive food products and to move the food products relative to the frame;

a side strapping assembly mounted to the frame proximate to the drive assembly, the side strapping assembly including a motor coupled to the frame, a side strapping blade configured to cut a side of the food products, a blade driving assembly coupled to the motor and configured to rotate the side strapping blade, and a clamp coupled to the blade driving assembly and configured to couple the blade driving assembly and the side strapping blade to the frame, wherein the clamp can be released from the frame without the use of tools to enable removal of the blade driving assembly, the side strapping blade, and the clamp from the frame; and a slicing blade on the frame forward of the drive assembly, the slicing blade being configured to slice the food products into slices.

2. The food product slicing apparatus of claim 1, wherein the frame includes a first shaft and the clamp is releasably coupled to the first shaft.

3. The food product slicing apparatus of claim 2, wherein the clamp includes a split ring partially surrounding the first shaft, the split ring further being coupled to the blade driving assembly, and a handle coupled to the split ring and configured to engage or release the clamp from the first shaft.

4. The food product slicing apparatus of claim 2, wherein the motor is mounted on a first side of the frame, and further comprising a second shaft coupled to the motor for rotation therewith, the second shaft having an end with a non-circular profile provided on a second side of the frame, and wherein the driving assembly is mounted on the end of the second shaft.

5. The food product slicing apparatus of claim 4, wherein the clamp includes a split ring partially surrounding the first shaft, the split ring further being fixed to the blade driving assembly, and a handle coupled to the split ring and configured to engage or release the clamp from the first shaft.

6. The food product slicing apparatus of claim 5, wherein the split ring includes a cam surface, the handle includes a head which engages the cam surface and a threaded fastener coupled to the head, the threaded fastener extending through first and second passageways in the split ring and passing through an opening of the split ring.

7. The food product slicing apparatus of claim 6, wherein the first passageway is unthreaded and the second passageway is threaded, wherein the threaded fastener is threadedly engaged with the second passageway.

8. The food product slicing apparatus of claim 7, further comprising a nut attached to an end of the threaded fastener.

9. The food product slicing apparatus of claim 4, wherein the first and second shafts are parallel to each other.

10. The food product slicing apparatus of claim 1, wherein the motor is mounted on a first side of the frame, and further comprising a shaft coupled to the motor for rotation therewith, the shaft having an end with a non-circular profile provided on a second side of the frame, and wherein the driving assembly is mounted on the end of the shaft.

11. The food product slicing apparatus of claim 10, wherein the driving assembly comprises a plate mounted on the end by a bearing, a gear mounted on the end for co-rotation therewith, a blade shaft extending from the plate and having the side strapping blade thereon, and a belt coupling the gear and the blade shaft together for co-rotation.

12. The food product slicing apparatus of claim 1, wherein the drive assembly includes at least one driven conveyor.

13. The food product slicing apparatus of claim 1, wherein the drive assembly includes an upper conveyor and a lower conveyor, wherein the side strapping assembly mounted to the frame proximate to the lower conveyor.

14. The food product slicing apparatus of claim 13, wherein the motor is mounted on a first side of the frame, and further comprising a first shaft coupled to the motor for rotation therewith, the first shaft having an end with a non-circular profile provided on a second side of the frame, and wherein the driving assembly is mounted on the end of the first shaft.

15. The food product slicing apparatus of claim 14, wherein the lower conveyor is driven by a second shaft, the first shaft extending through the second shaft, and the end of the first shaft extending outward from the second shaft.

16. The food product slicing apparatus of claim 14, further comprising a chute provided between the side strapping blade and the lower conveyor.

17. The food product slicing apparatus of claim 13, wherein the lower conveyor is driven by a second motor driving a first shaft mounted on the frame.

18. The food product slicing apparatus of claim 17, wherein the motor of the side strapping assembly is mounted on a first side of the frame, and further comprising a second shaft coupled to the motor of the side strapping assembly for rotation therewith, the second shaft having an end with a non-circular profile provided on a second side of the frame, and wherein the driving assembly is mounted on the end of the second shaft.

19. The food product slicing apparatus of claim 18, wherein the second shaft extends through the first shaft, and the end of the second shaft extending outward from the first shaft.

20. The food product slicing apparatus of claim 1, further comprising a chute provided between the side strapping blade and the drive assembly.

* * * * *